United States Patent [19]
Bridigum

[11] 3,845,778
[45] Nov. 5, 1974

[54] AUTOMATIC DRAIN VALVE
[75] Inventor: Robert J. Bridigum, Pittsburgh, Pa.
[73] Assignee: Westinghouse Air Brake Company, Wilmerding, Pa.
[22] Filed: Dec. 13, 1973
[21] Appl. No.: 424,412

[52] U.S. Cl. ............................................. 137/204
[51] Int. Cl. ............................................ F16t 1/14
[58] Field of Search .................................. 137/204

[56] References Cited
UNITED STATES PATENTS
3,004,549  10/1961  Temple .............................. 137/204
3,509,901  5/1970   Hollibaugh ........................ 137/204
3,659,625  5/1972   Coiner ............................... 137/204

Primary Examiner—Alan Cohan
Attorney, Agent, or Firm—W. F. Poore; R. W. McIntire, Jr.

[57] ABSTRACT

This invention relates to an automatically operative drain valve device for periodically draining accumulated moisture condensation and other contaminants from a fluid pressure storage reservoir upon a reduction of the pressure of the fluid in the reservoir from a chosen pressure to a lower chosen pressure independently of a governor device which controls the operation of a fluid compressor that supplies fluid under pressure to the storage reservoir.

7 Claims, 1 Drawing Figure

PATENTED NOV 5 1974 3,845,778
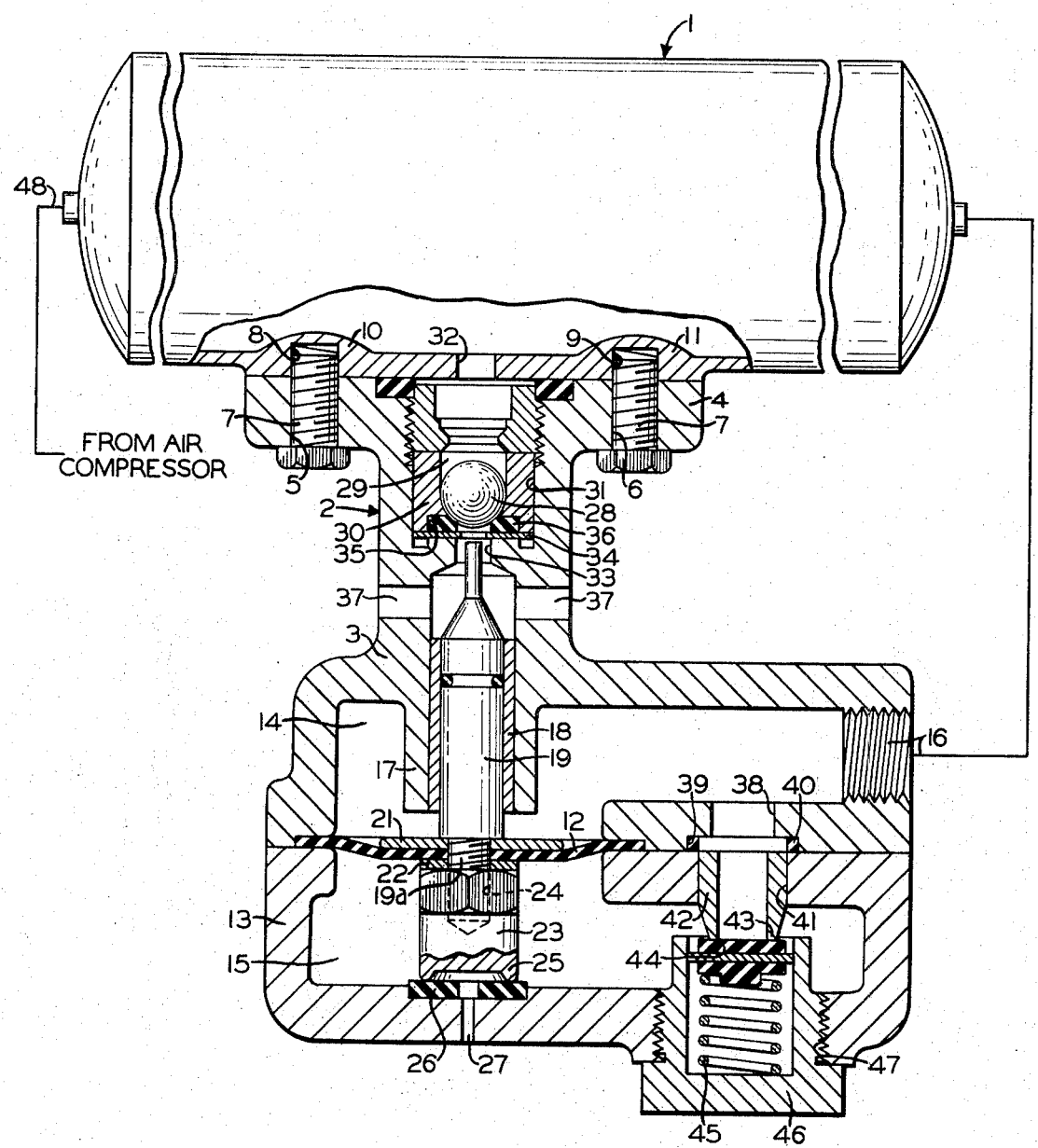

AUTOMATIC DRAIN VALVE

BACKGROUND OF THE INVENTION

In U.S. Pat. No. 2,125,144, issued July 26, 1938 to Burton S. Aikman, and assigned to the assignee of the present application, there is shown an automatic drain valve device for a storage reservoir. This drain valve device embodies a spring-biased piston that is subject on one side to the pressures of fluid in the storage reservoir and on the opposite side to the pressure in a chamber to which fluid under pressure is supplied from the one side via a valve when unseated from a valve seat formed at one end of a bore extending from one side to the other of the piston. This valve has a stem on the end of which is formed a valve that when unseated from its seat, in response to a reduction of the pressure on the one side of the piston to a value less than that in the chamber and the seating of the first valve, provides a communication through which contaminants from the storage reservoir, after passing therefrom to the chamber, via the first valve while open, are expelled to atmosphere by the trapped fluid under pressure in the chamber prior to its flow through this communication to atmosphere. Accordingly, this drain valve device is operative upon a comparatively small reduction of pressure in the storage reservoir and therefore on the one side of the piston. Therefore, several operations of this drain valve device may occur as the result of usage of fluid under pressure from the reservoir subsequent to stopping of a compressor that supplies fluid under pressure to this reservoir, before sufficient time has elapsed for the moisture entrained in the compressed air to condense into a liquid that can be expelled to atmosphere upon operation of the drain valve device. Such unnecessary and ineffective operations of the drain valve device result in a waste of some of the fluid under pressure compressed by the compressor.

Accordingly, it is the general purpose of this invention to provide a novel drain valve device wherein the operation thereof occurs only upon a reduction of the pressure in the storage reservoir to a value substantially equal to that required to cause the compressor governor to restart or reload the compressor subsequent to the stopping or unloading thereof by operation of the governor in response to the pressure in the storage reservoir reaching a chosen pressure higher than the restarting or reloading pressure.

SUMMARY OF THE INVENTION

According to the present invention, a novel automatic drain valve device comprises a movable abutment that is subject on one side to the pressure of fluid in a storage reservoir and on the opposite side to pressure in a chamber charged with fluid under pressure from the storage reservoir via a spring-loaded check valve. Secured to the respective opposite sides of the abutment is a pair of valves, one of which, upon a reduction of pressure in the storage reservoir and on the one side of the abutment to a value less than that in the chamber, is operated by the abutment to establish a communication through which contaminants are expelled from the bottom of the storage reservoir to atmosphere. The other of the pair of valves is operated sumultaneously with the one valve to establish a communication between the chamber on the opposite side of the abutment and atmosphere through which fluid under pressure is released from this chamber thereby enabling the storage reservoir pressure effective on the one side of the abutment to deflect it in the direction to cause closing of the first valve thereby terminating expulsion of contaminants from the storage reservoir.

In the accompanying drawing:

The single FIGURE is a view of a storage reservoir 1, shown partly in section, to the bottom of which reservoir is secured a drain valve device 2 embodying the invention.

The drain valve device 2 comprises a casing 3 that has formed integral therewith a flange 4. This flange 4 is provided with a pair of spaced-apart parallel smooth bores 5 and 6 through each of which extends a cap screw 7 that has screwthreaded engagement with one of a pair of coaxial screw-threaded bottomed bores 8 and 9 provided in a pair of spaced-apart bosses 10 and 11 integral with the bottom of the reservoir 1.

As shown in the drawing, a flat annular diaphragm 12 has its outer periphery clamped between the lower side of the casing 3 and a lower cover member 13 that is secured to the casing 3 by any suitable means (not shown). The diaphragm 12 cooperates with the casing 3 and the cover member 13 to form on the respective opposite sides of this diaphragm a pair of chambers 14 and 15, the chamber 14 being connected to the interior of the storage reservoir 1 by a passageway and correspondingly numbered pipe 16 so that the pressure in the chamber 14 is always the same as that in the reservoir 1.

Formed integral with the casing 3 and extending into the chamber 14 is a guide sleeve 17 into which is press-fitted a bushing 18. A stem 19 extends through the bushing 18 and is provided on its lower end with a screw-threaded portion 19a that extends through the annular diaphragm 12 and a pair of diaphragm follower plates 21 and 22 disposed on the respective opposite sides of the diaphragm 12. A cylindrical exhaust valve member 23 of larger diameter than stem 19 is disposed in the chamber 15. This valve member 23 has a hexagonal head formed at its upper end and is provided with a screw-threaded bottomed bore 24 for receiving therein the screw-threaded portion 19a of the stem 19 thus enabling this valve member 23 to act as a nut and clamp the inner periphery of the diaphragm 12 between the diaphragm follower plates 21 and 22.

Formed on the lower end of the exhaust valve member 23 is an annular rib constituting an exhaust valve 25 that is adapted to seat on a resilient annular exhaust valve seat 26 that is coaxial with a bore 27 of small diameter extending through the lower cover member 13. It will be understood that this bore 27 constitutes a timing choke that controls the rate of release of fluid under pressure from the chamber 15 to atmosphere when the exhaust valve 25 is unseated from its seat 26 in a manner hereinafter described.

A ball-type check valve 28 for controlling communication between the interior of the storage reservoir 1 and atmosphere is disposed in a valve chamber 29 provided in a bushing 30 that is press-fitted into a counterbore 31 provided therefor in the casing 3. The counterbore 31 is coaxial with a bore 32 in the bottom of the storage reservoir 1 and a bore 33 in the casing 3. An annular metallic member 34 is disposed between the upper end of the bore 33 and the lower end of the bushing 30 which is provided with a counterbore 35 in which is received an annular resilient valve seat 36 against which the check valve 28 is normally seated.

The lower end of the bore 33 is open to atmosphere via a plurality of atmospheric ports or passageways 37 formed in the casing 3.

One-way flow of fluid under pressure from the chamber 14 to the chamber 15 is provided by a check valve device now to be described.

As shown in the drawing, the casing section 3 is provided with a bore 38 and a coaxial counterbore 39 in which is disposed an annular resilient seal 40 that surrounds the upper end of a bore 41 formed in the cover member 13 and opening at its lower end into the chamber 15. A bushing 42 having an annular valve seat 43 at its lower end is press-fitted into the bore 41 and a flat disc-type check valve 44 is normally biased against this valve seat 43 by a spring 45 that is interposed between this check valve 44 and a screw-threaded plug 46 which has screw-threaded engagement with an internal screw-threaded bore provided therefor in the lower cover member 13.

OPERATION

In initially charging the apparatus shown in the drawing, a fluid compressor (not shown) supplies fluid under pressure to the interior of the storage reservoir 1 via a pipe 48. The fluid under pressure thus supplied to the storage reservoir 1 flows through the bore 32 and exerts a force on the ball-type check valve 28 to press it downwardly against its seat 36.

Furthermore, fluid under pressure supplied to the interior of the storage reservoir 1 flows therefrom to the chamber 14 above the diaphragm 12 via the pipe and passageway 16. Fluid under pressure thus supplied to the chamber 13 flows through the bore 38 and bushing 42 to the upper side of check valve 44. Upon the pressure in the chamber 14 and effective on the upper side of check valve 44 increasing to the value sufficient to overcome the force of the spring 45, this check valve 44 will be moved downward away from its seat 43 against the yielding resistance of the spring 45.

When the check valve 44 is thus unseated from its seat 43, fluid under pressure will flow from the chamber 14 to the chamber 15 via bore 38, bushing 42 and past the unseated valve 44. The fluid under pressure supplied to the storage reservoir 1 by the fluid compressor will flow therefrom to the chambers 14 and 15 until the pressure in this reservoir reaches the value required to cause the compressor governor of the (not shown) to stop or unload the compressor thereby preventing a further supply of fluid under pressure to the storage reservoir 1 and consequently, an increase of the pressure in this reservoir and the chambers 14 and 15.

It is apparent that as fluid under pressure is supplied to the chamber 14 to increase the pressure therein, the pressure in the chamber 15 will likewise be increased. Consequently, the pressure in the chamber 15 will be increased until it reaches a value that is less than that of the pressure in the chamber 14 by an amount dependent on the strength of the spring 45. Accordingly, it will be understood that when the compressor is unloaded or stopped so that there is no further supply of fluid under pressure to the storage reservoir 1 and the chamber 14, fluid under pressure will flow from this chamber 14 to the chamber 15 until the pressure acting on the upper side of the check valve 44 is reduced to a value that is insufficient to maintain or hold check valve 44 open. Therefore, the spring 45 will reseat this check valve 44 on its seat 43 to prevent further flow from the chamber 14 to the chamber 15.

From the foregoing, it is apparent that the chamber 14 is charged to substantially the same pressure as the storage reservoir 1 and the chamber 15 is charged to a pressure that is less than the pressure in the chamber 14 by an amount dependent on the strength of the spring 45.

It should be noted that since the diameter of the stem 19 is less than the diameter of the exhaust valve member 23, the effective area of the upper side of the diaphragm 12 is greater than the effective area of the lower side of this diaphragm. Consequently, the fluid under pressure supplied to the chamber 14 acts on a greater effective area than the fluid under pressure supplied to the chamber 15. Therefore, a differential force that acts in a downward direction is established on the diaphragm 12 and this differential force is effective to maintain exhaust valve 25 seated on its seat 26 as the chambers 14 and 15 are charged with fluid under pressure in the manner hereinbefore described.

Any liquid and other contaminants that accumulates in the reservoir 1 as the result of the condensation occurring while the compressor is unloaded or stopped flows by gravity to the lower portion thereof, and through the bore 32 in the bottom of this reservoir to the valve chamber 29 above the check valve 28.

On a subsequent reduction in the pressure of the fluid in the storage reservoir 1 and the chamber 14, connected to this reservoir via the passageway and pipe 16, as the result of withdrawal or use of fluid under pressure therefrom, there is a reduction of the force exerted by this fluid under pressure on the effective area of the upper side of the diaphragm 12, it being noted that the check valve 44 prevents flow of fluid under pressure from the chamber 15 to the chamber 14.

The strength of the spring 45 and the effective area of the upper and lower sides of the diaphragm 12 are so selected that the trapped pressure in the chamber 15 is such that, upon the pressure in the chamber 14 being reduced, as a result of withdrawal and use of fluid under pressure from the storage reservoir 1, to a value that is substantially that required to cause the governor to reload the compressor, a differential of pressure, that acts in an upward direction, is established on the diaphragm 12 which is sufficient to deflect this diaphragm in an upward direction.

Upon this upward deflection of the diaphragm 12, the exhaust valve 25 is lifted upward from its seat 26 so that the fluid under pressure in the chamber 15 is released to atmosphere via the bore 27 which, as hereinbefore stated, is of such size as to constitute a choke.

It should be noted that upon unseating of the exhaust valve 25 from its seat 26, the effective area of the lower side of the diaphragm 12 is increased by an amount equal to the area within the annular exhaust valve 25. Therefore, the fluid under pressure present in the chamber 15, subsequent to unseating of the exhaust valve 25 from its seat 26, and acting on this increased effective area of the lower side of the diaphragm 12 will deflect the diaphragm 12 upward with a snap action.

As the diaphragm 12 is deflected upward in the manner just described, the stem 19 is moved upward so that its upper end lifts the ball check valve 28 from its seat 36. Upon the unseating to the ball check valve 28 from its seat 36, the water resulting from condensation of the moisture in the compressed fluid under pressure in the storage reservoir 1 and other contaminants which have collected in the bottom of this storage reservoir and in the valve chamber 29 above the ball check valve 28 will be forced by the fluid under pressure in the storage reservoir 1 past the unseated ball check valve 28 and thence to atmosphere via the bore 33 and ports 37.

When the exhaust valve 25 is unseated from its seat 26 in the manner explained above, fluid under pressure present in the chamber 15 flows at a controlled rate to atmosphere via the bore 27 which constitutes a choke. Consequently, the pressure in the chamber 15 will reduce at a rate determined by the size of the bore 27. Accordingly, after a period of time, determined by the size of the bore 27, the pressure in the chamber 15 will be reduced to that present in the chamber 14.

When the pressure in the chamber 15 has reduced to a value slightly less than that present in the chamber 14, a differential of pressure will be established on the respective opposite sides of the diaphragm 12 which differential acts in a downward direction. Consequently, the diaphragm 12 will be deflected downward until the exhaust valve 25 is reseated on its seat 26 thereby preventing further flow of fluid under pressure from the chamber 15 to atmosphere via the bore 27.

As the diaphragm 12 is deflected downward, the stem 19 is moved downward to the position in which it is shown out of contact with the ball check valve 28. Consequently, as the stem 19 is moved downward to the position shown, the fluid under pressure in the chamber 29 and the storage reservoir 1 is rendered effective to reseat the ball check valve 28 on its seat 36 and thereby close communication between the interior of the reservoir 1 and atmosphere. It is apparent, therefore, that the length of time that the ball check valve 28 remains open to allow the expulsion of contaminants from the bottom of the reservoir 1 and the chamber 29 is determined by the diameter of the bore 27 which constitutes a choke and also the rate at which fluid under pressure is withdrawn from the storage reservoir 1 and chamber 14 connected thereto via passageway and pipe 16 during the time that the exhaust valve 25 is unseated from its seat 26.

Subsequent to the reseating of the ball check valve 28 on its seat 36 and operation of the compressor governor to start or reload the compressor, fluid under pressure will be supplied to the storage reservoir 1 by the compressor until the pressure therein has increased to the value required to operate the governor to stop or unload the compressor.

Subsequent use of fluid under pressure from the storage reservoir 1 will cause a reduction of the pressure therein and operation of the drain valve device 2 in the manner hereinbefore described.

Having now described the invention what I claim as new and desire to secure by Letters Patent, is:

1. An automatically operative drain valve device for expelling contaminants from a fluid pressure storage reservoir to atmosphere, said drain valve device comprising:
   a. a casing having a passageway extending therethrough via which contaminants may be expelled from the interior of the reservoir to atmosphere,
   b. a cover member secured to said casing,
   c. a movable abutment having its outer periphery disposed between said casing and said cover member, said abutment cooperating with said casing and said cover member to form a pair of chambers disposed on the respective opposite sides of said abutment, one of said chambers being constantly in communication with the interior of the storage reservoir,
   d. a biased one-way flow valve means providing for flow of fluid under pressure from said one chamber to the other of said chambers,
   e. a restricted communication between said other chamber and atmosphere,
   f. a first valve means operable by said abutment to control flow of contaminants from the storage reservoir to atmosphere via said passageway in said casing, and
   g. a second valve means operable by said abutment to control flow of fluid under pressure from said other chamber to atmosphere via said restricted communication,
   h. said abutment being responsive to a chosen reduction of the pressure in said one chamber below that in said other chamber to simultaneously operate said first and second valve means to respectively cause expulsion of contaminants from said storage reservoir to atmosphere via said pasageway and release of fluid under pressure from said other chamber to atmosphere via said restricted communication until the pressure in said other chamber is less than that in said one chamber whereupon said abutment is rendered effective to cause said first valve means to terminate said expulsion of contaminants and said second valve means to terminate the release of fluid under pressure from said other chamber.

2. An automatically operative drain valve device, as recited in claim 1, further characterized in that said first valve means and said second valve means are disposed on the respective opposite sides of said abutment.

3. An automatically operative drain valve deivce, as recited in claim 1, further characterized in that said first valve means and said second valve means are disposed on the respective opposite sides of said abutment, and are so constructed and connected to said abutment as to provide that the effective area of that side of said abutment on which said first valve means is disposed is greater than the effective area of that side of said abutment on which said second valve means is disposed so long as said second valve means closes communication between said other chamber and atmosphere via said restricted communication.

4. An automatically operative drain valve device, as recited in claim 1, further characterized in that said first valve means comprises:
   a. a check valve,
   b. a seat for said check valve, and
   c. a cylindrical valve stem for effecting unseating of said check valve from said seat, said stem being operatively connected to one side of said abutment, and said second valve means comprises:
   a. an annular valve seat disposed about said restricted communication, and
   b. a cylindrical valve member having a diameter greater than the diameter of said cylindrical valve stem of said first valve means, said cylindrical valve member having formed on one end an annular rib constituting a valve for cooperation with said valve seat to control communication between said other chamber and atmosphere via said restricted communication.

5. An automatically operative drain valve device, as recited in claim 1, further characterized in that said restricted communication extends through said cover member.

6. An automatically operative drain valve device, as recited in claim 1, further characterized in that said one-way flow valve means is carried by said cover member.

7. An automatically operative drain valve device, as recited in claim 3, further characterized in that, upon said second valve means opening said restricted communication between said other chamber and atmosphere, the effective area of that side of said abutment on which said second valve means is disposed is increased to a value in excess of the effective area of that side of said abutment on which said first valve means is disposed thereby effecting positive snap-action of said abutment to operate said first valve means.

* * * * *